United States Patent Office 2,874,058
Patented Feb. 17, 1959

2,874,058

CAROTENOID PREPARATIONS

Heinrich Klaui, Riehen, and Hermann Moor, Basel, Switzerland, assignors to Hoffmann-La Roche Inc., Nutley, N. J., a corporation of New Jersey No Drawing. Application September 27, 1956
Serial No. 612,358

Claims priority, application Switzerland
September 30, 1955

2 Claims. (Cl. 99—148)

The present invention relates to a highly concentrated carotenoid preparation suitable for dyeing foods and feeds.

β-Carotene is a natural oil-soluble dyestuff which is more and more used for dyeing fats and oils, such as margarine, butter, cooking fat, etc. However, the pure crystalline β-carotene is not only rather sensitive to oxidation but also very sparingly soluble in the ordinary solvents so that it has not been possible hitherto to find a commercial form meeting the requirements of the fat and oil industry. Thus, e. g., it is inconvenient to admix the pure crystalline β-carotene directly to the fat or oil to be dyed as the β-carotene crystals dissolve so slowly that it is practically impossible to obtain a uniform dyeing. It has, therefore, been tried to provide the oil and fat industry with β-carotene in the form of saturated oil solutions. However, such solutions have a very low carotene content; generally they contain less than 1% of β-carotene so that the proportion of ballast material is objectionably high. Moreover, such solutions involve the danger that, during storage, the β-carotene may partially crystallise out so that this commercial form is not satisfactory either.

It is also known to use dispersions of micro-crystals of β-carotene in oil or fat. These dispersions, when stirred into pre-heated fats or oils will yield clear solutions in a relatively short time. However, such dispersions of carotenoid microcrystals may cause staining in the finished product if, after the dissolution step, some solid carotene microcrystals remain undissolved. A further drawback of oil suspensions of microcrystalline β-carotene resides in the fact that, during storage, some sedimentation resulting in non-uniform dyeings may occur. In order to avoid staining it is, therefore, necessary to heat these dispersions together with the whole mass or at least part of the oil or fat to be dyed until the very last crystals are dissolved. Consequently, this commercial form is not ideal either.

Further efforts have, therefore, been made in view of finding a new method which would meet the requirements of the oil and fat industry as regards the ease of handling, uniformity of the tinctorial power, stability, etc. of the carotenoid dyestuff.

It has now been found that a highly concentrated carotenoid preparation which is suitable for dyeing foods and feeds and which complies with the requirements of the oil and fat industry comprises a carotenoid dyestuff in the form of an at least 3% solidified solution thereof in an edible solvent for carotenoids which is solid at room temperature.

β-Carotene is the preferred carotenoid dyestuff. However, the preparation of the present invention is also suitable for dyeing oils and fats with other carotenoid dyestuffs, such as bis-dehydro-carotene, lycopene, isozeaxanthene, zeaxanthene and other homologues of β-carotene. Particularly suitable solvents for carotenoids include higher aliphatic alcohols which are solid at room temperature, especially the so-called wax alcohols, e. g. cetylic alcohol; higher aliphatic acids which are solid at room temperature, e. g., palmitic acid, margaric acid, stearic acid; or esters thereof which are solid at room temperature, e. g. cetyl palmitate or glyceryl monostearate; and mixtures of these substances.

The highly concentrated carotenoid preparations according to the present invention are waxy dark-red coloured solids which in amounts corresponding to the amounts of carotenoids used in practice for dyeing purposes, will dissolve rapidly in oils or heated fats to give clear solutions. They can be moulded into thin slabs similar to chocolate slabs. In this form the preparations are particularly suitable, especially if the slabs are provided with a network of breaking grooves, for dosing in a simple manner the amount of carotenoid necessary for dyeing a given quantity of oil or fat. A further suitable commercial form of the carotenoid preparation of the present invention is a free-flowing product which consists of small pellets or flakes of the solid carotenoid solution. This free-flowing product can be readily poured, weighed or bottled. Although in the preparations of the present invention the carotenoids are protected against oxidation to a large extent, it may be advisable in some cases to use preparations which contain small amounts of antioxidants, such as tocopherol and/or ascorbyl palmitate, etc. The carotenoid preparation of the present invention is suitable for the production of concentrated oily solutions which can be used for dyeing foods and feeds. They are moreover particularly suitable for direct application in the dyeing of foods such as fats, oils, margarine, etc.

According to the present invention the highly concentrated carotenoid preparations which are suitable for dyeing foods and feeds are prepared by means of a method which comprises dissolving by heating a carotenoid dyestuff at a concentration of at least 3% in an edible solvent for carotenoids which is solid at room temperature and which, on rapid cooling from the molten condition, solidifies at such a rate that crystallisation of the carotenoid dyestuff dissolved therein is avoided, and rapidly cooling the resulting solution.

In carrying out this process it is convenient to heat the carrier mass to a temperature exceeding 100° C. because dissolution therein of the carotenoids is particularly rapid above 100° C. and also because the carotenoids, after cooling of the solution, are more readily soluble in oils and fats. The amount of carotenoid to be dissolved must correspond to a final concentration of at least 3% by weight, preferably of about 15% by weight. It may be convenient to add to the solvent, prior to dissolving the carotenoid therein, an antioxidant, e. g. tocopherol and/or ascorbyl palmitate, etc., in an amount up to 1% of the final product. The molten mass is then rapidly cooled to solidify the carrier substance before the dissolved carotenoid crystallises out. For this purpose the molten mass can e. g. be poured into cooled moulds, allowed to flow onto cooled rolls or cooled by spraying.

The invention will now be illustrated by the following examples, however without being limited thereto.

*Example 1*

85 grams of cetylic alcohol were heated to 120–130° C. and 0.2 grams of ascorbyl palmitate and then 15 grams of β-carotene were added to the alcohol. As soon as the β-carotene was completely dissolved the solution was poured into a metal mould adapted for casting tablets and contained in a cooling bath. The cooling action must be so strong that the cetylic alcohol solidifies before β-carotene can crystallise out; the thickness of the layer should not substantially exceed 5 mm. The resulting dark red tablet was sufficient for dyeing 2 to 3 tons of margarine in a pleasant butter-like shade.

*Example 2*

85 kg. of cetylic alcohol were heated to 120–130° C., and 500 grams of tocopherol and 200 grams of ascorbyl palmitate and then 15 kg. of β-carotene were added to the alcohol. The hot, clear solution was sprayed into a carbon dioxide atmosphere from a rotating cylinder (cylinder diameter 20 mm., 6000 R. P. M.) through fine openings of 0.4 mm. diameter in the cylinder wall. There was thus obtained a free-flowing red-brown powder consisting of pellets having a diameter of about 0.6 mm.

*Example 3*

70 grams of palmitic acid were heated to 120–130° C., and 0.5 gram of tocopherol and then 30 grams of β-carotene were added to the acid. As soon as the β-carotene was completely dissolved the solution was poured into moulds and rapidly cooled.

*Example 4*

By replacing the cetylic alcohol used in Example 1 by an equivalent amount of cetyl palmitate there was obtained a dyeing preparation which could be used in the same manner as the preparation of Example 1.

*Example 5*

By replacing the β-carotene used in Example 1 by an equivalent amount of 15,15'-dehydro-β-carotene there was obtained a preparation which yielded a slightly more yellow colour than the preparation containing β-carotene.

*Example 6*

85 grams of cetylic alcohol were heated to 120–130° C., and 0.2 gram of ascorbyl palmitate and then 15 grams of lycopene were added to the alcohol. As soon as the lycopene was completely dissolved the solution was sprayed in the manner described in Example 2. There was thus obtained a dyeing powder of dark-red colour. This preparation is particularly suitable for obtaining reddish tints.

*Example 7*

90 grams of distilled glycerylmonostearate (having a monoester content of about 85%) were heated to 140° C., and 0.5 gram of tocopherol and 10 grams of β-carotene were added to the monostearate. The molten mass was then rapidly cooled by pouring it onto cooled metal cylinders. The solidified mass was removed from the cylinder in the form of flakes. This product was further reduced to a smaller particle size, while cooling with solid carbon dioxide, to obtain a free-flowing, fine granulate.

*Example 8*

88 grams of a glyceryl stearate (containing about 55% of glyceryl monostearate, the balance consisting predominantly of di-ester and a small amount of tri-ester) were heated to 140° C., and 0.2 gram of ascorbyl palmitate and 12 grams of β-carotene were added to the stearate. As soon as the β-carotene was completely dissolved, the solution was poured, while rapidly cooling, onto cooled cylinders in the manner described in Example 7.

What we claim is:

1. A concentrated carotenoid composition comprising a solid solution containing at least about 15 percent by weight of carotenoid in cetylic alcohol.

2. A composition as in claim 1 wherein the carotenoid is carotene.

References Cited in the file of this patent

UNITED STATES PATENTS

| | | |
|---|---|---|
| 1,371,450 | Speck | Mar. 15, 1921 |
| 2,546,748 | Herlow | Mar. 27, 1951 |